(12) United States Patent
van de Waerdt

(10) Patent No.: US 6,760,818 B2
(45) Date of Patent: Jul. 6, 2004

(54) MEMORY REGION BASED DATA PRE-FETCHING

(75) Inventor: Jan-Willem van de Waerdt, Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 177 days.

(21) Appl. No.: 10/136,732

(22) Filed: May 1, 2002

(65) Prior Publication Data

US 2003/0208660 A1 Nov. 6, 2003

(51) Int. Cl.[7] .......................... G06F 12/00; G06F 13/00
(52) U.S. Cl. ...................... 711/137; 711/100; 711/154; 712/207; 712/237
(58) Field of Search ............................... 711/100, 104, 711/118, 137, 154; 712/207, 237

(56) References Cited

U.S. PATENT DOCUMENTS

| | | | | |
|---|---|---|---|---|
| 4,796,175 A | * | 1/1989 | Matsuo et al. ............... | 712/207 |
| 5,146,578 A | * | 9/1992 | Zangenehpour ............. | 711/137 |
| 5,423,048 A | * | 6/1995 | Jager .......................... | 712/207 |
| 5,442,767 A | | 8/1995 | Eickemeyer et al. | |
| 5,619,676 A | * | 4/1997 | Fukuda et al. ............... | 711/137 |
| 5,761,506 A | | 6/1998 | Angle et al. | |
| 5,802,566 A | | 9/1998 | Hagersten | |
| 5,854,921 A | | 12/1998 | Pickett | |
| 5,950,232 A | | 9/1999 | Harasawa | |
| 5,961,631 A | | 10/1999 | Devereux et al. | |
| 6,073,215 A | * | 6/2000 | Snyder ........................ | 711/137 |
| 6,079,006 A | | 6/2000 | Pickett | |
| 6,157,993 A | * | 12/2000 | Lewchuk ..................... | 711/213 |
| 6,202,130 B1 | * | 3/2001 | Scales et al. ................ | 711/137 |
| 6,272,516 B1 | | 8/2001 | Angle et al. | |
| 6,321,330 B1 | * | 11/2001 | Doshi et al. ................. | 712/241 |
| 6,353,879 B1 | | 3/2002 | Middleton et al. | |

OTHER PUBLICATIONS

"Improved Processor Performance by Dynamically Pre–Processing the Instruction Stream", Dundas J.D., The University of Michigan 1997.

"Evaluating Stream Buffers as a Secondary Cache Replacement", by S. Palacharla et al., Proceedings of the Annual International Symposium on Computer Architecture., XP–010098147, pp. 24–33.

"Compiler Driver Data Cache Prefetching for High Performance Computers", by Chi–Hung Chi et al., IEEE Region 10's Ninth Annual International Conference, pp. 274–278.

* cited by examiner

Primary Examiner—Tuan V. Thai
(74) Attorney, Agent, or Firm—Aaron Waxler

(57) ABSTRACT

As microprocessor speeds increase, performance is more affected by data access operations. A combined solution of hardware and software directed pre-fetching limits additional instructions in a program stream, and minimizes additional hardware resources. In the current invention, the hardware and software directed pre-fetching technique is performed without explicit pre-fetch instructions utilized within the program stream and occupies a minimal amount of additional chip area. To minimize instruction bandwidth of the processor, the software and hardware directed pre-fetching approach uses additional registers located at an architectural level of the processor to specify pre-fetch regions, and a respective stride used for each of the regions. The impact to the instruction bandwidth of processing of instructions by the processor is limited to those additional instructions contained within the application that are required to set these registers. The frequency of pre-fetches is controlled using a spacing of memory access instructions contained within the application.

20 Claims, 10 Drawing Sheets

MEMORY REGION BASED DATA PRE-FETCHING

FIELD OF THE INVENTION

The field of the invention relates to the area of data pre-fetching from a computer memory and more specifically to the area of pre-fetching data from a computer memory in a manner to minimize processor stall cycles.

BACKGROUND OF THE INVENTION

As microprocessor speeds increase, processor performance is more and more affected by data access operations. When a processor, in operation, needs to await data due to slow data retrieval times, this is termed a processor stall and, in quantitative terms is referred to as processor stall cycles. A larger number of processor stall cycles is indicative a longer delay.

Early computer systems, suffered from the limitation of magnetic storage media speed. As such, caching of disk drive data is well known to enhance data access performance. In a typical caching operation, data is fetched or pre-fetched from its storage location to a cache—a temporary but faster memory hold—for more rapid access by the processor. Thus, the speed limitations of bulk storage media are obviated if the entire stored data is cached in RAM memory, for example.

Presently, processors are so fast that processor stall cycles even occur when retrieving data from RAM memory. The processor stall cycles are used to increase the time to allow data access operations to complete. As would be anticipated, pre-fetching of data from RAM memory is now performed to reduce processor stall cycles. Thus, different levels of cache memory supporting different memory access speeds are used for storing different pre-fetched data. When incorrect data is pre-fetched into the cache memory, a cache miss condition occurs which is resolvable through processor stall cycles. Incorrect data pre-fetched into the cache memory may result into cache pollution; i.e. removal of useful cache data to make place for non-useful pre-fetched data. This may result in an unnecessary cache miss resulting from the replaced data being needed again by the processor.

Memory is moved in data blocks to allow for faster transfer of larger blocks of memory. A data block represents a basic unit of data for transfer into or between different levels of cache memory hierarchy; typically, a data block contains multiple data elements. By fetching a data block into a higher level of cache memory hierarchy before the data block is actually required by the processor, the processor stall cycles due to a cache miss are avoided. Preferably, the highest level of cache memory hierarchy is such that a data block pre-fetched into said level of cache memory hierarchy is retrieved by the processor without any stall penalty; this yields peak processor performance. Of course, data blocks that are to be retrieved and that are not yet present in the highest level of the cache memory hierarchy are either subject to pre-fetching before they are needed or reduce overall processor performance.

Advantageously, a goal of pre-fetching in a processor-based system is to reduce a processing time penalty incurred by processor cache misses. As such has been addressed in the prior art. For example, in U.S. Pat. No. 6,272,516, a method is disclosed where the use of multiple processors reduces cache misses. U.S. Pat. No. 5,761,506, entitled "Method and apparatus for handling cache misses in a computer system", also discloses a manner in which cache misses are reduced.

In the paper entitled, "Improving Processor Performance by Dynamically Pre-Processing the Instruction Stream," Dundas J. D., The University of Michigan 1997, multiple dynamic pre-fetching techniques are disclosed as well as methods for their use. State of the art pre-fetching techniques usually rely on certain regularity in references to data stored in RAM made by the instructions executed by the processor. For example, successive executions of a memory reference instruction, such as a processor load instruction, may refer to memory addresses separated by a constant value, known as stride. This stride is used to direct a pre-fetch of a data block contained in an anticipated future referenced memory address. Thus, pre-fetching exploits a spatial correlation between memory references to improve processor performance, where the spatial correlation between data blocks is used to improve processor performance. In some cases, within cache memory, spatial locality of the data blocks is useful to improve performance. Prior Art U.S. Pat. No. 6,079,006, entitled "Stride-based data address prediction structure discloses a data prediction structure that stores a base addresses and stride values in a prediction array.

Pre-fetching may be directed by software, by means of programming, by compiler inserted pre-fetch instructions, or may be directed by means of hardware. In the case of hardware directed pre-fetching, the hardware tries to detect regularity in memory references and automatically, without the presence of explicit pre-fetch instructions in the program stream, generates pre-fetching of data blocks. Combined hardware/software based techniques are also known in the prior art. Although the prior art pre-fetching techniques are intended to improve processor performance, there are some downsides to using them.

For example, successive references to memory addresses A, A+200, A+400, and A+600, may direct the prior art pre-fetch mechanism to pre-fetch the data block containing address A+800, assuming a stride of 200, when the data block is not yet present in the higher level of cache memory hierarchy and has not yet been requested.

The process of pre-fetching data blocks uses a bus, which provides for communication between the memory, in the form of RAM, and cache memory, and as a result pre-fetching of data blocks from the memory uses the bus and therefore increased bus utilization and decreases bus bandwidth. This process of pre-fetching may also result in the pre-fetching of data blocks that will not be used by the processor, thereby adding an unnecessary load to the bus utilization where another fetch may be necessary for the processor in order to obtain the required data. Fetching a data block into a certain level of the cache memory hierarchy requires replacing of an existing cache data block, where the replacing of such a data block may result in extra bus utilization. Often, the cache data blocks are re-organized such that the block being replaced is moved to a lower level of the cache memory hierarchy. Furthermore, the moved data block is no longer available at the highest level of cache memory hierarchy for future reference and may result in other cache misses.

On the other hand, pre-fetching of extra data blocks, in anticipation of their use by the processor, may also result in bursty bus utilization, where the pre-fetches are not spread in time but follow each other rapidly in succession. This problem is most apparent when a series of pre-fetches are initiated to fetch multiple data blocks that hold for example data relating to a two dimensional sub-structure of a larger two dimensional structure. Such as in the case of a cut and paste operation, where a sub graphic image is fetched from a larger graphic image laid out in memory in row-order format. Bursty bus utilization may cause temporary starvation of other processor components that require the shared bus resource, which may result in other types of processor stall cycles, thus having a degrading effect on processor performance. Software directed pre-fetching typically requires insertion of pre-fetch instructions into the program stream being executed by the processor, thereby decreasing processor instruction bandwidth. Hardware directed pre-fetching usually requires a non-negligible amount of chip area to detect regularity in memory references. In the prior art, the use of memories of several kilobytes to monitor memory references is not unknown for hardware based techniques. Such hardware techniques are employed such that pre-fetching of data blocks is initiated early enough so that the pre-fetch is completed by the time the pre-fetched data is actually required by the processor, otherwise the processor will stall to resolve the cache miss condition.

Efficient pre-fetching significantly improves processor performance, while attempting to limit the downsides. Therefore, it would be advantageous to have a pre-fetching technique which does not rely on dynamically detected regularity in data memory references made by instructions within the program stream, as well as having a pre-fetching technique that supports a low level of occurrences of stall cycles by the processor attributable to cache misses.

There exists a need to provide a hardware and software directed approach to pre-fetching of data in such a manner that the occurrence of processor stall cycles is reduced.

SUMMARY OF THE INVENTION

In accordance with the invention there is provided a processor for processing of instruction data including memory access instructions for accessing an external RAM memory comprising: a region stride memory location for storing of a pre-fetch operation stride; a memory region identifier for storing data indicative of a memory region within the external RAM memory within which to apply the stored pre-fetch operation stride; a pre-fetch circuit for pre-fetching of data from the external RAM memory, the pre-fetching circuit responsive to the pre-fetch memory stride when accessing data within the pre-fetch memory region for fetching from said memory using said stride.

In accordance with the invention there is also provided a method of pre-fetching data from external RAM memory, comprising the steps of: providing to a processor for use in storing within memory locations a stride and data determinative of a memory region within the external RAM, the stride for use in pre-fetching of data from within the memory region; determining a region within which the data is stored for being pre-fetched therefrom; determining the pre-fetch stride stored within the processor in association with the region; defining a data block having a size based on the pre-fetch stride and a start location based on a previously pre-fetched data block memory location within the external memory; and, copying the data block located at the start location to a destination memory location.

In accordance with the invention there is also provided method of pre-fetching a data block from data memory into buffer memory, comprising the steps of: providing a processor having memory therein and a pre-fetch circuit; providing random access memory; providing within the memory within the processor a lookup table having stored therein a relation between at least a region and a corresponding region stride; comparing a data memory reference instruction data memory access address to the at least a region stored within the lookup table to determine a region within which the data memory reference instruction data memory access address is located; and, providing the region stride associated with the region within which the data memory reference instruction data memory access address is located to the pre-fetch circuit of the processor.

In accordance with another aspect of the invention there is provided a storage medium having data stored thereon, the data indicative of executable instructions for performing the steps of: storing within memory within the processor data indicative of a first pre-fetch stride; and storing within memory within the processor data indicative of a first region of memory within which to employ the first pre-fetch stride.

In accordance with yet another embodiment of the invention there is provided a process for performing the step of: performing a memory allocation operation, the memory allocation operation dependent on a data type for storage within the allocated memory, the memory allocation operation including the steps of: allocating a memory region within memory, storing within memory within the processor data indicative of a first pre-fetch stride for the allocated memory region and storing within memory within the processor data indicative of the allocated memory region location and size within which to employ the first pre-fetch stride.

BRIEF DESCRIPTION OF THE DRAWINGS

Exemplary embodiments of the invention will now be described in conjunction with the following drawings, in which.

DETAILED DESCRIPTION

Typically, software application files have a header portion, usually found at the beginning of the application file. Upon loading of the application the header portion is read by an operating system and processed by a processor in order to determine memory, in the form of computer random access memory (RAM), requirements for the instruction code portion of the application. Based on the size and type of memory requested the operating system allocates a portion of program memory to the application. During execution, the application allocates memory to data, in the form of data memory. Of course, the maximum available data memory is sometimes allocated for the application as defined within the header portion. Each block of data memory requested during execution is provided with a handle—a pointer to a pointer within a memory management pointer table—to that block of data memory for future access by instructions within a program stream of the application. As far as the application is concerned, the blocks of data memory, which have been assigned to it, are contiguous and fixed. That said, the blocks need be neither contiguous nor fixed. The memory management pointer table will point to the current location of data being accessed. The application is only provided with a handle to each allocated data memory block allowing the operating system to move memory contents in order to more effectively use the existing memory. This gives the operating system flexibility in swapping absolute locations of memory blocks within the data memory without causing changes for the application since the application is assigned a handle to each data memory block it references.

Figure 1:
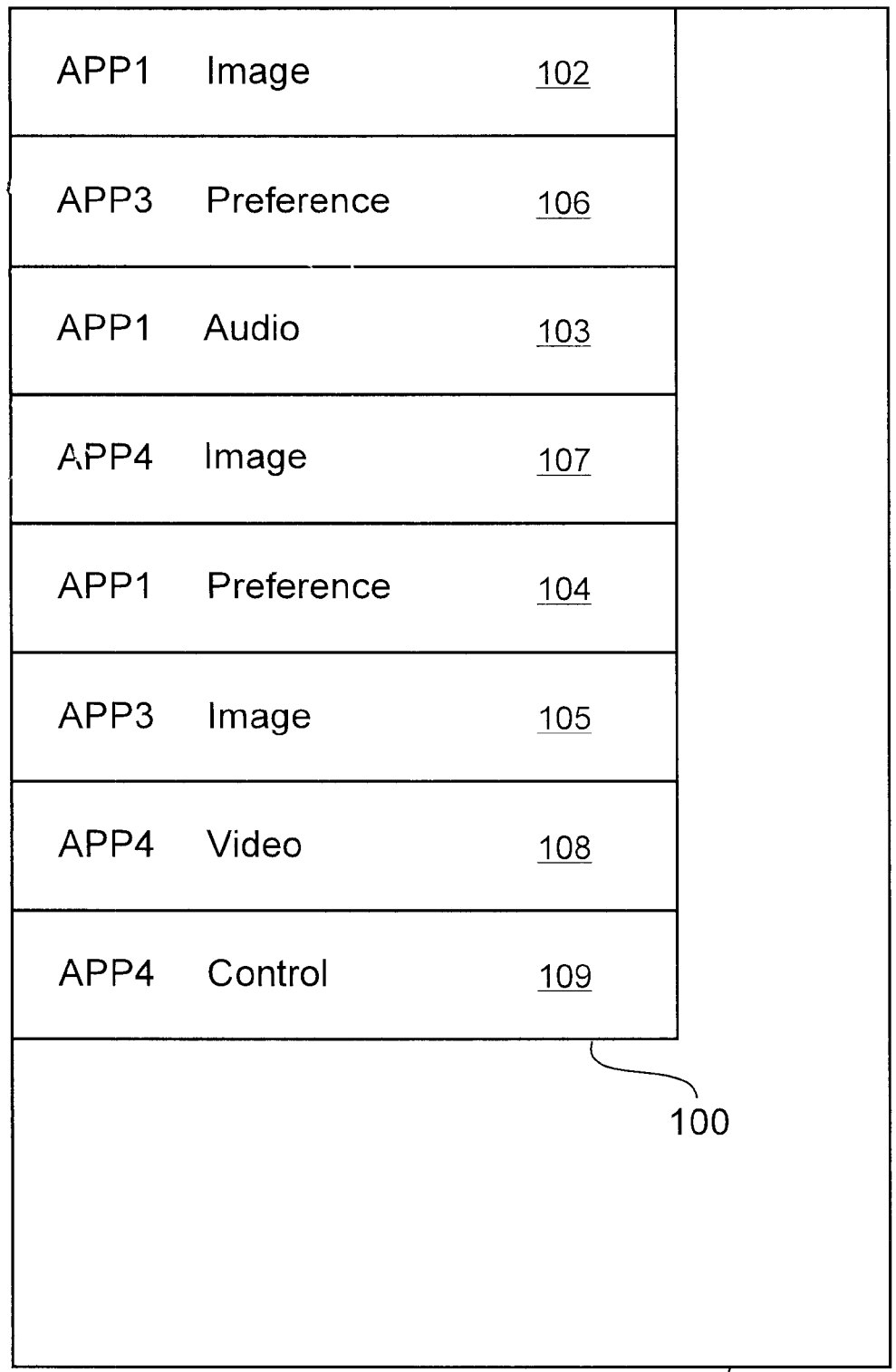
FIG. 1 illustrates a prior art map of a data memory portion of a computer memory.

With reference to FIG. 1, a prior art map of a data memory 100 portion of a computer memory 101 is shown in accordance with known memory mapping techniques. This type of memory map results, for instance, when using a multi-tasking operating system such as Windows™. Multi-tasking operating systems are capable of executing a number of different applications that are contained in memory. In order for this to work each application has a portion of data memory assigned specifically for its use. In this example multiple applications have their data elements stored in their respective data memory blocks. The data memory blocks are of different types and sizes having therein stored variables being application specific, in that each application accesses it's own data memory blocks and does not overwrite data memory blocks of other applications in order to facilitate multi-tasking. APP1 for instance has data memory blocks assigned for image data 102, another set of data memory blocks audio data 103, and another set of data memory blocks for preference data 104. APP3 on the other hand uses a portion of memory having data memory blocks for image data 105 and data memory blocks for preference data 106, whereas APP4 has data memory blocks assigned for storing image data 107, video data 108, and control data 109. These data memory blocks are allocated for each application in dependence upon sequencing of data allocation requests within the software application. Thus, similar types of data are typically stored in many different locations. This type of memory allocation is known in the prior art and therefore there are various known methods used for pre-fetching of data elements from these data memory blocks.

Figure 2:
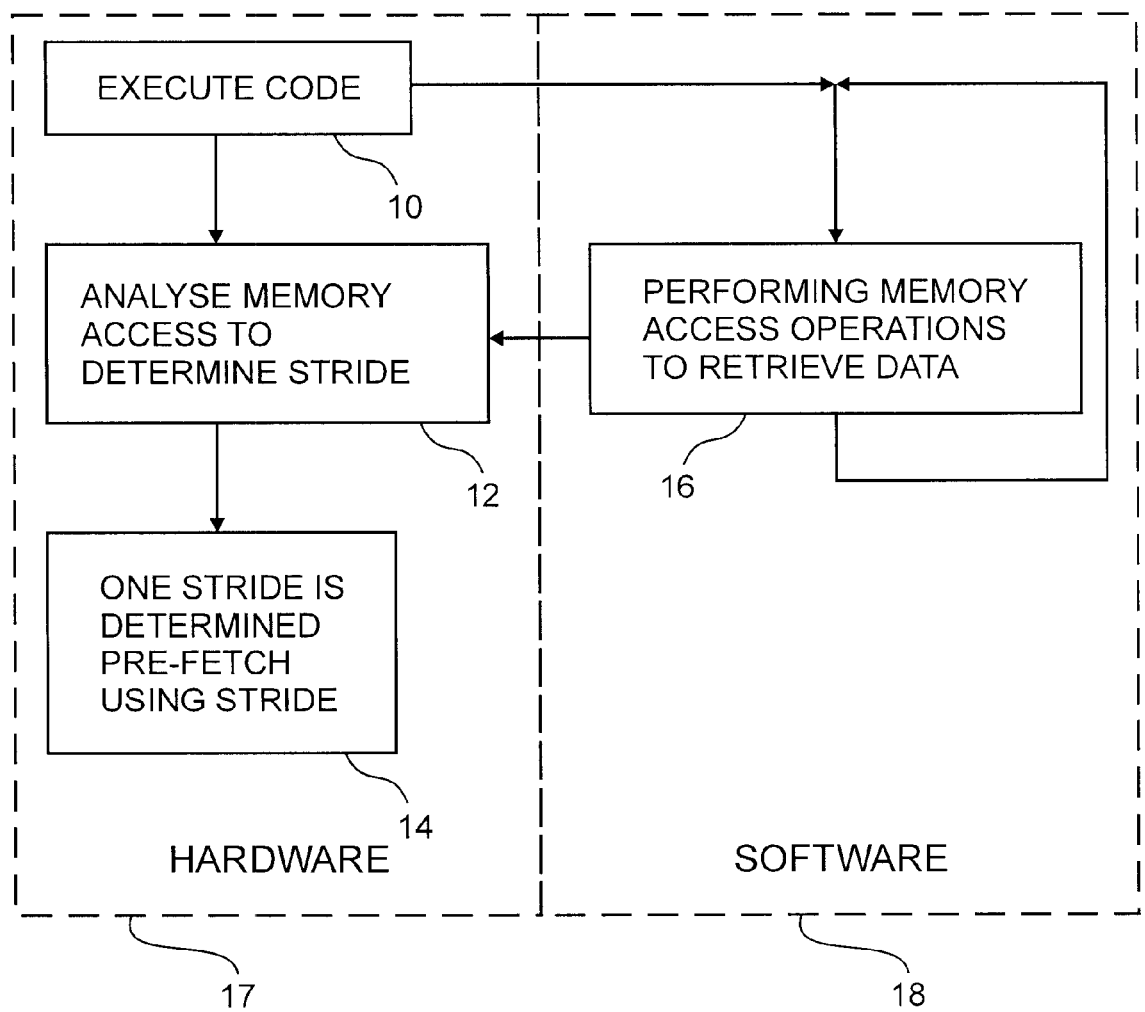
FIG. 2 outlines a generic set of tasks that are used for hardware and software pre-fetching as taught in the Prior Art.

In prior art FIG. 2, a generic set of tasks is outlined which are used for hardware and software pre-fetching. The processor in combination with the operating system loads and executes a software application having a program stream containing instructions 10. As the processor executes instructions in the program stream 10, memory access operations are performed in software 18 in order to retrieve data 16 from memory 100 for use by the instructions. As the memory 100 is accessed by the instructions a memory access pattern is analyzed by hardware 17 in order to determine a stride 12. Once the stride is determined from the access pattern, a pre-fetch of data is performed 14 by hardware dependent upon the determined stride. The pre-fetch retrieves anticipated data from memory for anticipated future use by an instruction within the program stream. Unfortunately, using hardware to analyze the memory access pattern requires significant hardware resources, and in some cases warrants the use of a second processor in order to efficiently perform the pre-fetching of data. Because this approach requires a large amount of additional hardware resources, it is known to be expensive. Additionally, the hardware requires time to detect a memory access pattern and in some cases due to a manner in which memory is referenced, the hardware approach may not be able to provide useful stride information.

Figure 3:
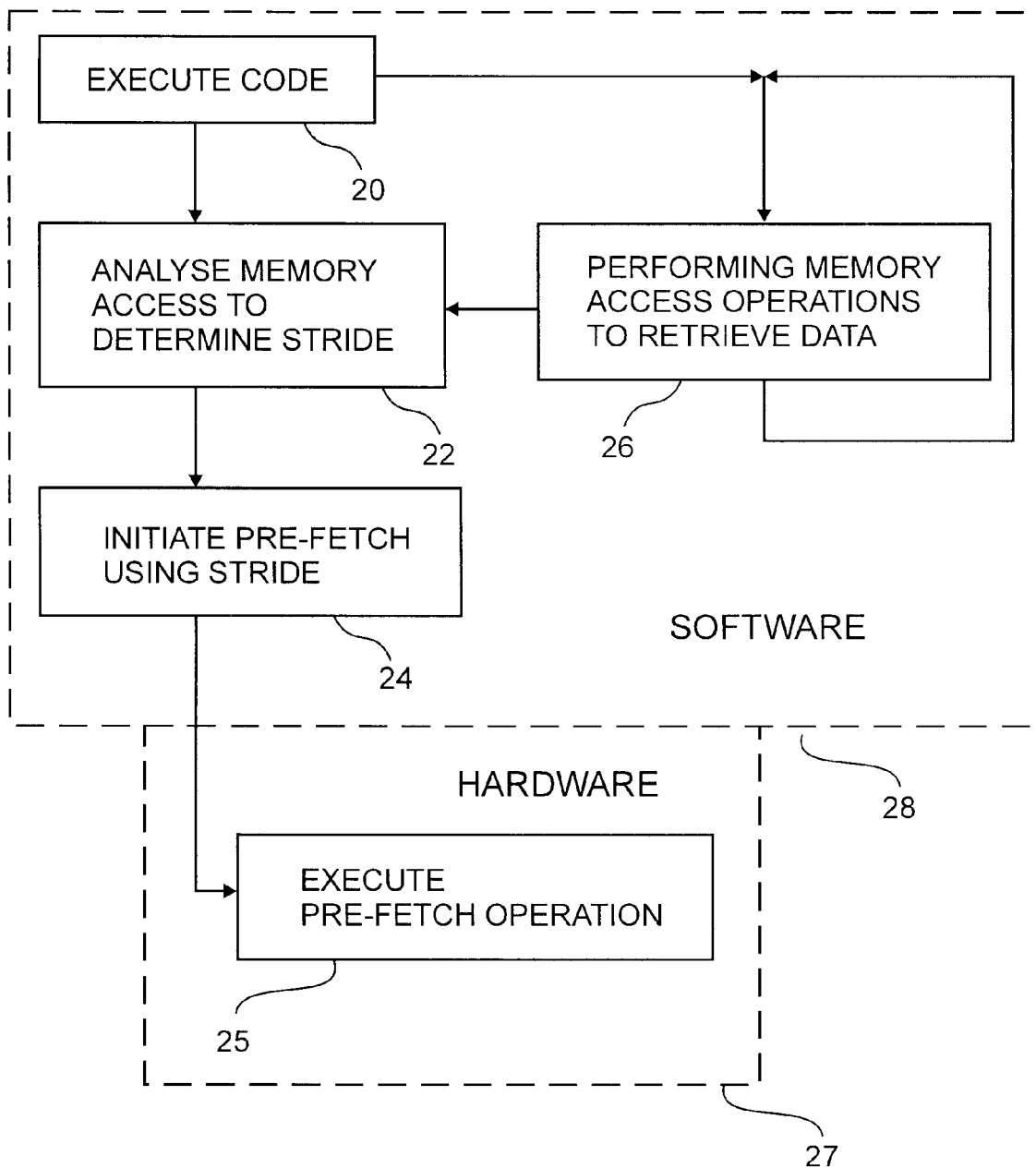
FIG. 3 outlines a same set of generic tasks that are used for hardware and software pre-fetching as taught in another embodiment of the Prior Art.

In Prior Art FIG. 3, a same set of generic tasks is outlined which are used for hardware and software pre-fetching. The processor in combination with the operating system executes a software application having a program stream containing instructions 20. As the processor executes instructions in the program stream, memory access operations are performed 26 in order to retrieve data from memory 100. As the memory is accessed by the instructions, a memory access pattern is analyzed by software in order to determine a stride 22. Once the stride is determined from the access pattern, a pre-fetch of data is initiated 24 by software, and then the pre-fetch is executed 25 by hardware in dependence upon the determined stride. Typically, the step of initiating the pre-fetch 24 requires an additional insertion of instructions or interrupts into the program stream in order to notify the hardware as to when the pre-fetch operation is to be executed 25. Unfortunately, because step 22 is executed by software 28 and because of the additional insertion of instructions within the program stream, processor bandwidth is significantly decreased since the processor performs an additional function of analyzing the memory access pattern, resulting in a slower program stream execution as compared to the process of 12, where the memory is analyzed using additional hardware. However, using software does decrease the cost of additional circuitry for stride determination.

Figure 4:
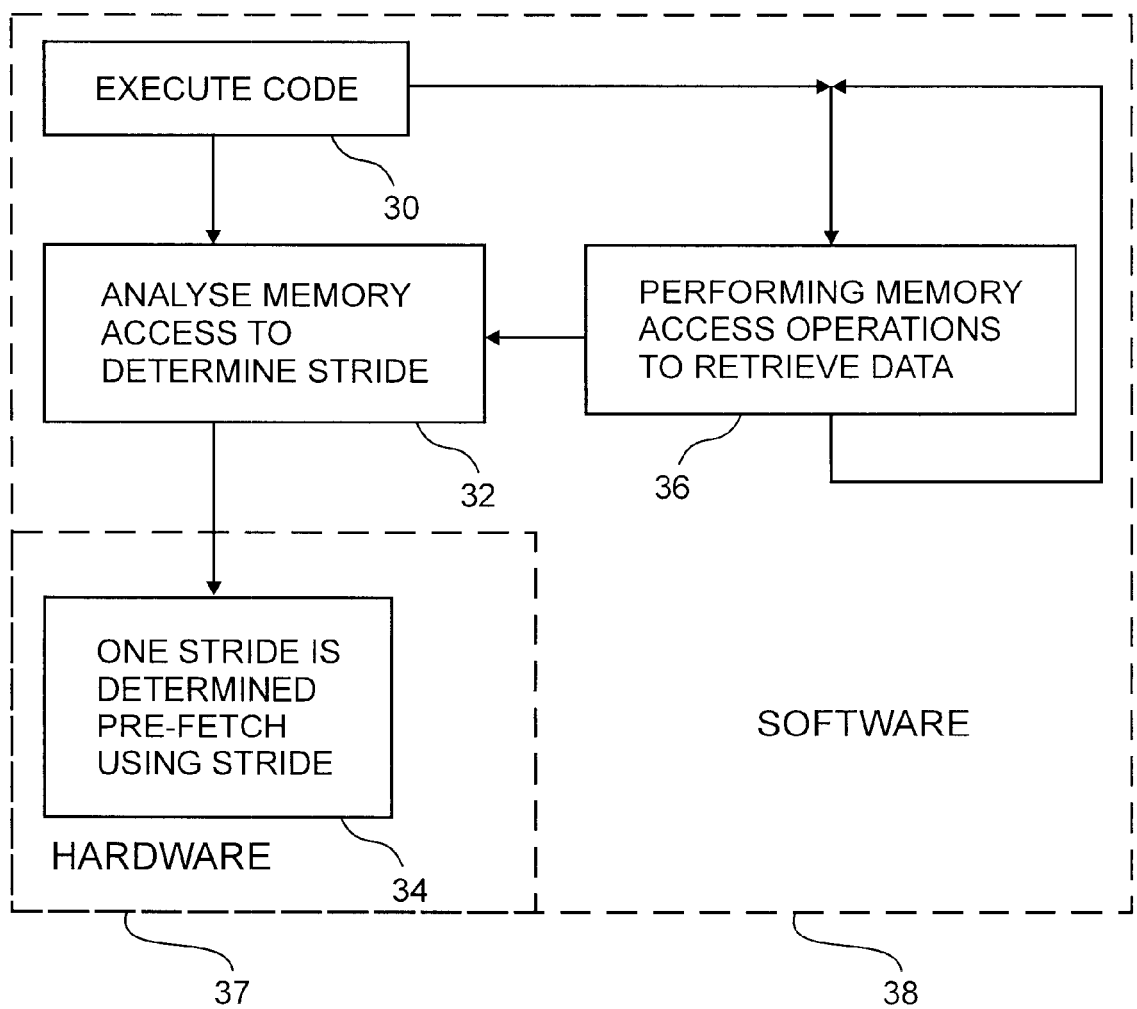
FIG. 4, outlines a generic set of tasks that are used for hardware and software pre-fetching as taught in yet another embodiment of the Prior Art.

In prior art FIG. 4, a generic set of tasks is outlined which are used for hardware and software pre-fetching. The processor in combination with the operating system executes a software application having a program stream containing instructions 30. As the processor executes instructions in the program stream, memory access operations are performed 36 in software 38 in order to retrieve data from data memory 100. As the memory is accessed by the instructions a memory access pattern is analyzed in software order to determine a stride 32. Once the stride is determined from the access pattern, a pre-fetch is initiated for performance 34 by hardware 37 for future data access in dependence on the determined stride. The pre-fetch retrieves anticipated data from data memory 100 (FIG. 1) for anticipated future use by an instruction within the program stream. Unfortunately, the stride is dynamically calculated, or the stride is calculated once and is not variable once the program stream is executed, or it is calculated once for a majority of data memory access operations and therefore suffers deficiencies where the application requires various strides for various types of data, such as is the case for multimedia applications.

Figure 5:
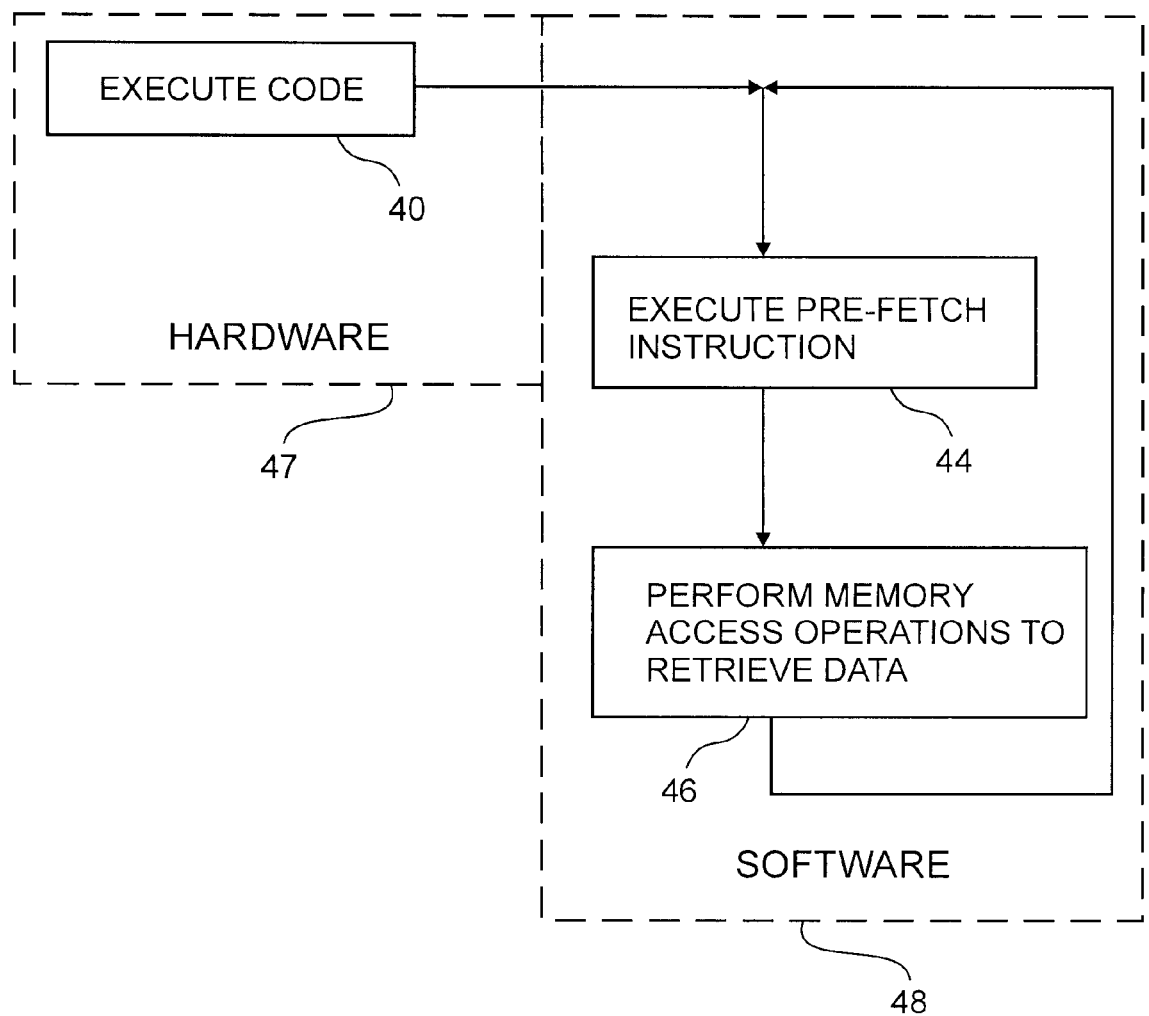
FIG. 5 outlines a different generic set of tasks that are used for hardware and software pre-fetching as taught in yet another embodiment of the Prior Art.

In prior art FIG. 5, a different generic set of tasks is outlined which are used for hardware and software pre-fetching. The processor in combination with the operating system executes a software application having a program stream containing instructions as well as pre-fetch instructions 40. As the processor executes instructions in the program stream, the pre-fetch instructions within the program stream pre-fetch data from memory 44, in software, in conjunction with memory access operations performed in order to retrieve data from memory 46, in software 48. A programmer or a compiler inserts the pre-fetch instructions. Typically for efficient processing of the instruction stream, the architecture of a hardware platform must be known beforehand, thus the software application must be altered in order to operate efficiently on other hardware platforms.

Providing a combined solution of hardware and software directed pre-fetching is the most advantageous since: instruction bandwidth is not compromised, by limiting an amount of additional instructions in a program stream, and an additional amount of hardware resources is minimized. Hardware resources translate into an amount of chip area required for these additional features. Instead of trying to detect regularity in memory references by hardware or software, as is taught in the prior art, the hardware and software directed pre-fetching technique, in accordance with an example embodiment of the invention, is performed without explicit pre-fetch instructions utilized within the program stream and with a minimal amount of additional chip area.

Figure 6:
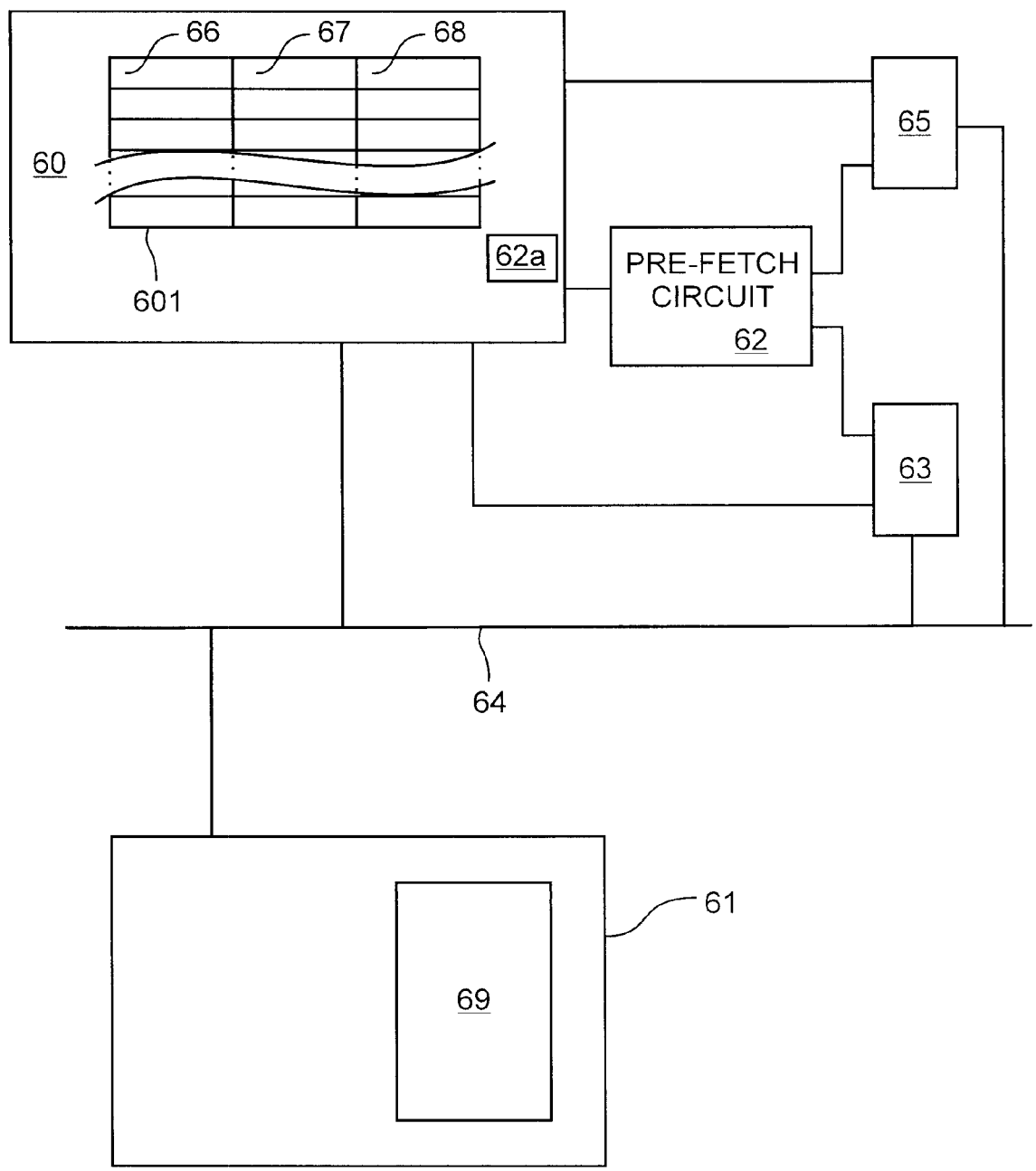
FIG. 6 illustrates an example embodiment of the invention for use in software and hardware directed region based pre-fetching.

FIG. 6 illustrates the example embodiment of the invention for use in software and hardware directed region based pre-fetching. In the preferred embodiment a processor 60 is electrically coupled to a cache memory 63, as well as to a buffer memory 65. A pre-fetch circuit 62 is also coupled to the processor 60 and to the two memories 65 and 63. A memory 61, in the form of a random access memory (RAM), is electrically coupled to a bus 64 for providing data from the memory 61 to either the buffer memory 65 or the cache memory 63. The pre-fetch circuit 62 is for directing transfer of data blocks from the memory 61 into these two memories 63 and 65 in dependence upon instructions from the processor 60 resulting from the processor executing a software application containing the program stream. Typically, cache memory 63 is integrated with the processor 60 and the pre-fetch circuit 62. A data block is a basic unit of data transferred between memory and cache memory, memory and buffer memory, cache memory and buffer memory, or between different levels of hierarchy within cache memory. For example the data block may be equal in size to that of a single cache line in the cache memory 63. The processor also contains a circuit for disabling pre-fetching 62a.

In order to minimize instruction bandwidth of the processor, the software and hardware directed pre-fetching approach uses additional registers located at an architectural level of the processor in order to specify pre-fetch regions, and a respective stride to be used for each of the regions. For instance additional registers are provided within the processor, these are: a region_base registers 66, a region_size registers 67, and a region_stride registers 68 within a multi line register lookup table 601. The region_base registers 66, the region_size registers 67, and the region_stride registers are all correlated within a triplet and correspond to a single line within the register lookup table, where a region_base register from within the region_base registers references each triplet—region_base, region_stride and region_size—of registers. Optionally, the register lookup table has multiple lines for accommodating multiple triplets of region base addresses, region sizes, and region strides.

Within a single line within the register lookup table the region_base register is used to receive a base address of a source memory region within the memory 61. The region_size register is used for receiving a size of the source memory region, and the region_stride register is used for receiving the stride to be used for pre-fetching of data within the source memory region. The impact to the instruction bandwidth of processing of instructions by the processor is limited to those additional instructions contained within the application that are required to set these registers. Once these registers are set, during loading of the application, no more time is needed to provide further values to these registers during application execution.

Figure 7:
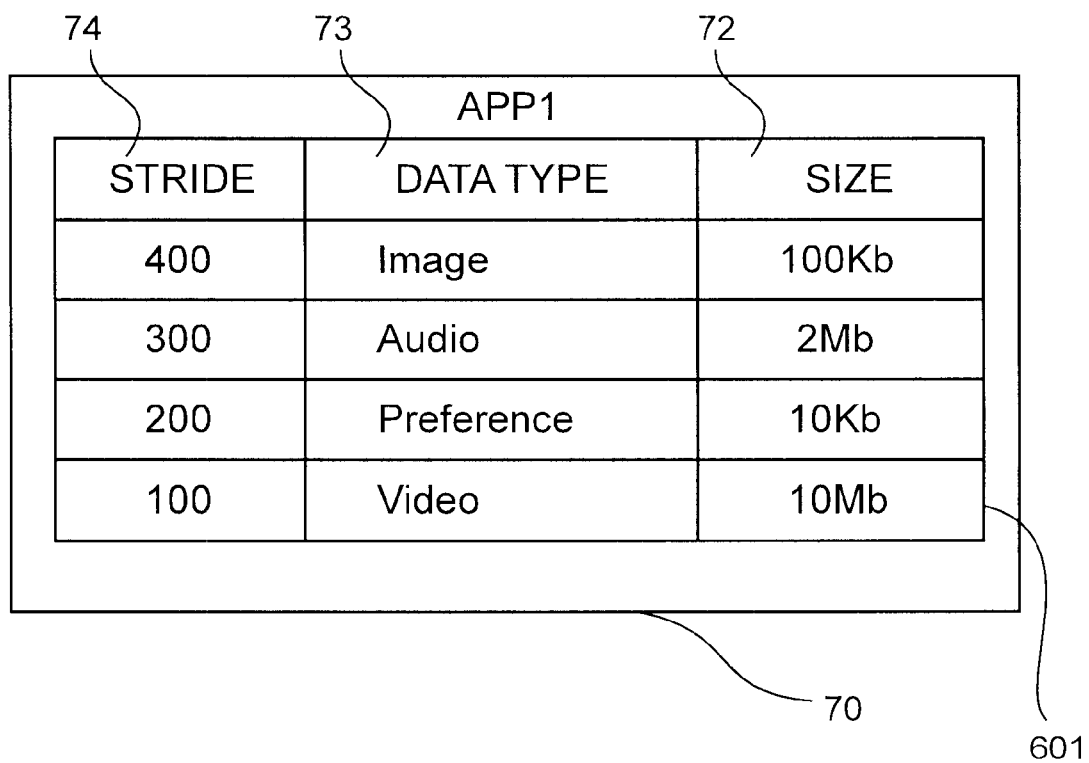
FIG. 7 illustrates a modification to a header portion of the application in accordance with the preferred embodiment.
Figure 8:
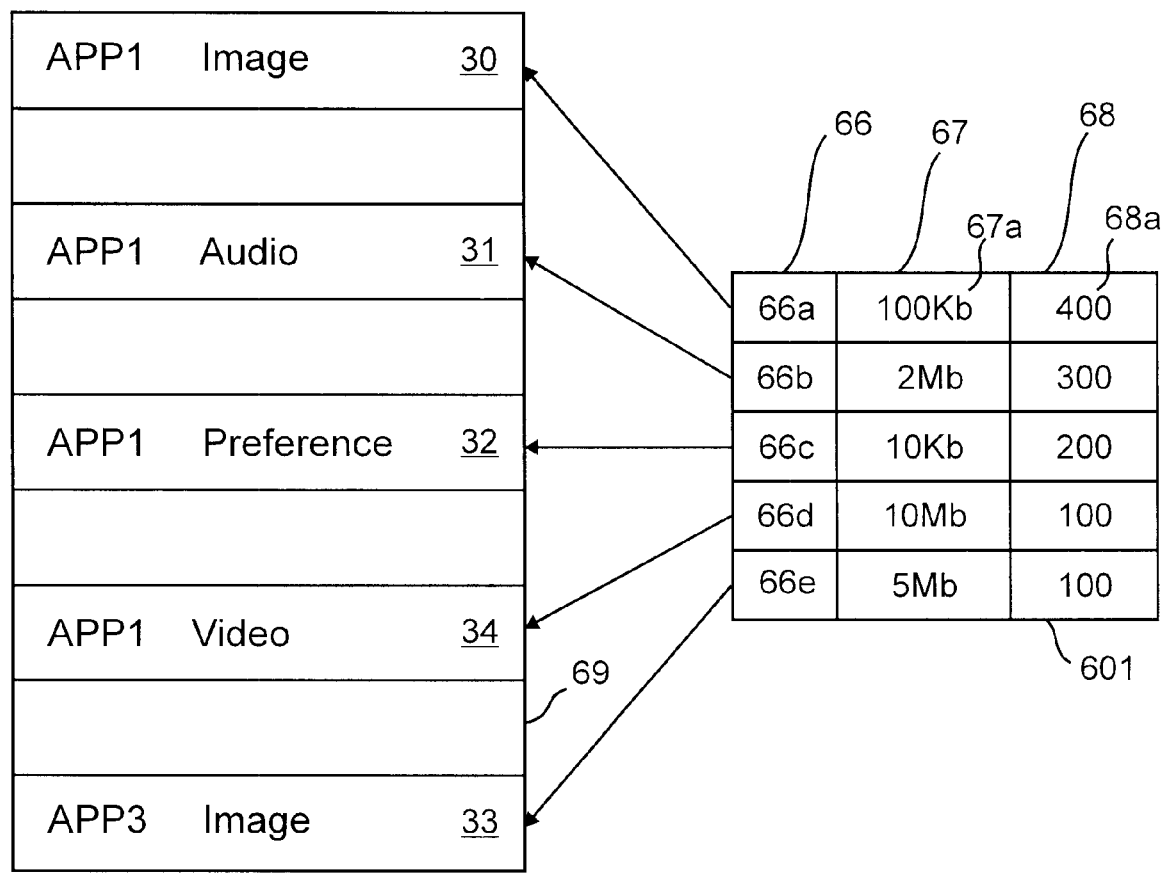
FIG. 8 illustrates organization of memory in order to facilitate the region-based hardware and software directed pre-fetching approach in accordance with the example embodiment.

In order to facilitate the region based hardware and software directed approach of pre-fetching, data memory allocated to each application is stored in a different manner as compared to the prior art technique shown in FIG. 1. With reference to FIG. 8, the memory is now organized so as to facilitate the region-based hardware and software directed pre-fetching approach. In the region-based approach the allocation of data memory blocks into appropriate regions within data memory is important, as is shown in FIG. 8. In order to allocate application data into regions a modification to the application header is performed, as is shown in FIG. 7, in order to facilitate this improved memory organization.

Upon loading of an application into memory 61 the header portion 70 of the application is read by an operating system and processed by the processor 60 in order to determine memory requirements for the application. Within the header portion a lookup table 601 is stored. The lookup table 601 correlates stride 74 with data type 73 and size of the data type 72. Based on the size 72 and data type 73 of memory requested, the operating system allocates regions in data memory in dependence upon the type of data 73 which will be stored within that region. Each region of data memory requested is provided with a handle to that region, the handle being stored within the register lookup table within one of the region_base registers 66. Corresponding region size 72 is stored within a corresponding region_size register 67a, and the stride 74 of the region is stored within a corresponding region_stride register. The values for storing in the region_stride register are created in the header portion of the program by a programmer or a compiler inserted. The region_size is optionally inserted by a programmer or a compiler, however in some cases the size of a region may not be known, but only the data type stored within that region is known and therefore a stride is only predetermined for the given region.

For instance, APP1 is being loaded into memory by the processor and operating system. Upon processing of the header from APP1 70 the processor determines that APP1 uses image data, video data, audio data, and preference data. Therefore APP1 requires a handle to each of the memory regions for use in storing of these data types. Within data memory 69 the processor allocates an image memory region 30 within data memory 69 and provides a handle to this memory region within the region_base register 66a. APP1 also uses video data and therefore the processor allocates a video memory region 34 within data memory 69 and provides a handle to this memory region within the region_base register 66d. Audio data storage space is also requested by APP1, and therefore the processor provides an audio memory region 31 within data memory 69 and provides a handle to this memory region within the region_base register 66b. APP1 also uses preference data, and as a result the processor provides a preference memory region 32 within data memory 69 and provides a handle to this memory region within the region_base register 66c. If another application, APP3 for instance, is also loaded into memory, and this application uses image data, then the processor assigns an image data region 33 for use by APP3 within data memory 69 and provides a handle to this memory region within the region_base register 66e.

Figure 9:
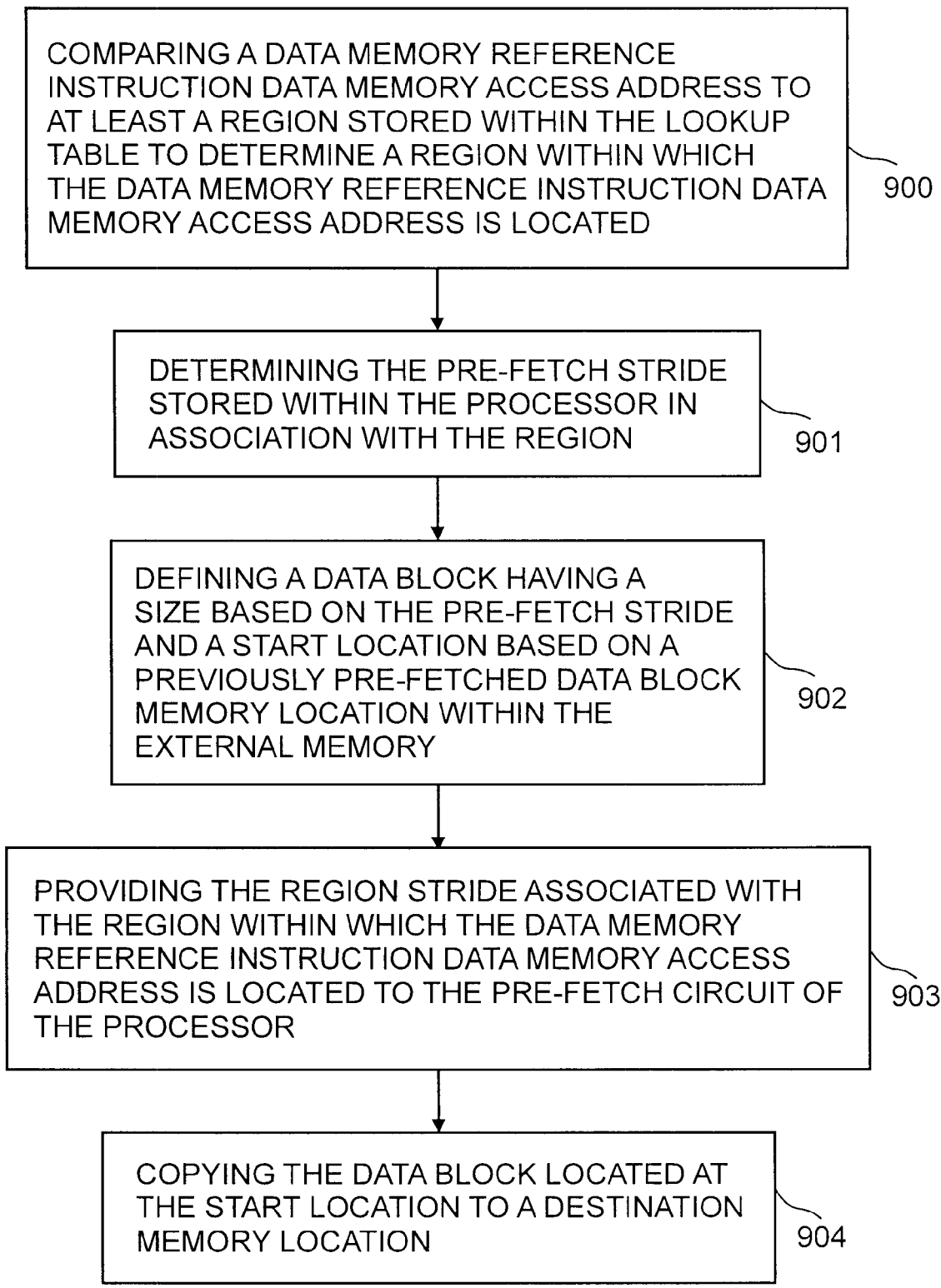
FIG. 9 outlines steps taken for performing data pre-fetching by the processor.

FIG. 9 outlines the steps taken by the processor for performing of data pre-fetching. In use, the processor, in combination with the operating system, executes instructions within the program stream provided by the software application stored within an instruction portion of the memory. Memory reference instructions within the program stream cause the processor 60 to access 900 various memory regions within the data memory 69 at addresses provided by the instructions 900 in order to process data, other than instruction data, by the processor 60. The processor compares the address provided by the memory reference instruction to the region_base registers 66 within the register lookup table and to the region_size registers 67. Once a match is found the processor then executes the memory reference instruction using the corresponding region_stride provided in the lookup table 901 for pre-fetching of a next data block from within the region referenced by the memory reference instruction. When a memory address reference within a specific region within the memory is made by an instruction in the program stream, a pre-fetch is initiated for the data element residing at that memory address, offset by the stride specific to the accessed region 902. In the pre-fetch initiation, the pre-fetch circuit is provided with a start location of the data block and a stride to be used for the region in which the data block resides 903. This region based approach allows for pre-fetching 904, or copying, of data elements based on the memory region being referenced, without requiring a single regularity in data memory references as noted in prior art pre-fetching techniques. In this manner accessing memory 900 starting at an address of region base will result in pre-fetching 904 of data located at region base+region stride. Such that upon a further access 900 to region_base+region_stride a subsequent data block 902 found at region_base+2*region_stride is loaded, and so on. In the case where the region_stride is the same size as the a cache line within cache memory the technique is called next sequential data block pre-fetching.

Usually a match between the memory access instruction address and address values stored within the region_base registers is found because addresses within the region_base registers are created from data regions that are utilized within the program stream. This register lookup table is representative of memory access addresses used by instructions within the program stream. Of course, instruction data may also form data within the data portion when not being executed. For example, this is the case when executing a compiler. The compiler produces output data that is instruction data but is managed as data and not treated as instructions during the compiler operation. Of course, these distinctions will be very evident to those of skill in the art.

Pre-fetched data is either stored in the buffer memory 65 (FIG. 6) or in the cache memory 63. Storing the pre-fetched data block or data blocks into cache memory overwrites data blocks residing in upper cache memory hierarchy, where data blocks previously resided in the upper hierarchy of cache memory are lowered in hierarchy within the cache memory and as a result will not be immediately accessible to the processor. This situation may result in a processor stall as it attempts to resolve a cache miss. In this manner when pre-fetched data is stored in the buffer memory, it does not interfere with data blocks contained in the cache memory hierarchy and is therefore more advantageous. In order to realize optimum processing speed, the processor first checks for data blocks within cache memory starting from those located at a higher level of hierarchy down to a lower level of hierarchy. Once the data block or data blocks have been stored in buffer memory they are transferable to cache memory as required, however in some cases if a copy command is being issued from a source memory location to a destination memory location then the data block or data blocks are copied from buffer memory into the destination memory without ever being in cache memory.

The hardware and software directed pre-fetching approach is effective in copying of data from a source memory location to a destination memory location. For example, in a copy operation, a certain amount of data blocks containing data elements are—copied from the source memory location to the destination memory location, within the same memory region. This copy process translates into a series of load and store instructions for the processor. Typically, data elements at the source location are not present at a high level in cache memory hierarchy or buffer memory. The process of pre-fetching would improve processor performance by fetching a data block in anticipation of it being required by the processor before it is actually required by a load instruction in the form of a memory access instruction.

Figure 10:
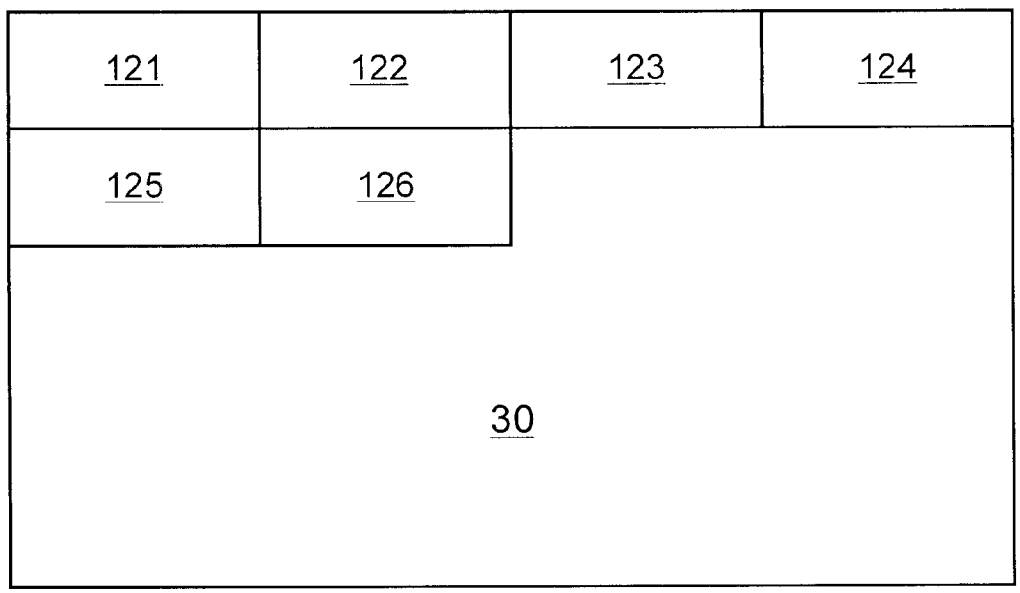
FIG. 10 illustrates organization of memory for use in a sequential copy operation performed in accordance with the example embodiment; and, FIG. 11 illustrates copying of multiple data block stored a same distance apart in memory.

For instance, FIG. 10 illustrates data blocks in image memory 30 for use in a sequential copying operation (not shown) of the data blocks from the source memory location 30 to the destination memory location (not shown). Each data block 121–125 contains multiple data elements. The load instruction is compared to the region_base registers to find a match and once a match is found the processor uses corresponding region_stride and region_size values. By setting the region_stride register to the size of a data block within the region—this value typically being set by a programmer or by a compiler—a memory access operation referencing a first data block within the source region will initiate a pre-fetch of a second data block within the same region. An operation referencing the second data block will initiate a pre-fetch of the third data block, etc. This technique is known as next sequential data block pre-fetching. The program stream provides the processor with information pertaining to the copy operation prior to execution of the copy operation by the processor. This facilitates improved copying performance from the source to destination memory locations because the stride is predetermined for the region, thereby resulting in a decrease in processor stall cycles. Data processing of data contained within some regions may be faster than that of data contained in others. As a result where data is processed faster a larger stride is used than for regions where data is processed slower.

FIG. 10 illustrates multiple data blocks (121–124) stored in the image source memory region 30 and associated with APP1. The stride for this region is predetermined by a programmer or compiler and stored within the region_stride register. In accordance with the hardware and software directed approach to pre-fetching, when a load instruction references the first data block 121, data block 122 is automatically pre-fetched; when the second data block 122 is referenced, data block 123 is pre-fetched and so on. In this case the stride is the size of a data block.

Of course, when time required to perform the pre-fetch operation of a data block is larger than the time to copy a single data block to the destination address, the processor stalls since the data block is not available to the processor. In this case it may help to set the stride for the given region to that of two data blocks, thereby looking further ahead in the source region, effectively providing more time for subsequent pre-fetch operations to fetch required data blocks, since the processor is busy for a longer time processing more data.

Again, with reference to FIG. 10, when the stride for this region is set to be the size of two data blocks the following pre-fetching sequence results. When a load instruction references the first data block 121, the first data block 121 along with a second data block 122 are stored in buffer memory. Data blocks 123 and 124 are automatically pre-fetched; when the third data block 123 is referenced, a pre-fetch of data blocks 125 and 126 occurs.

Figure 11:
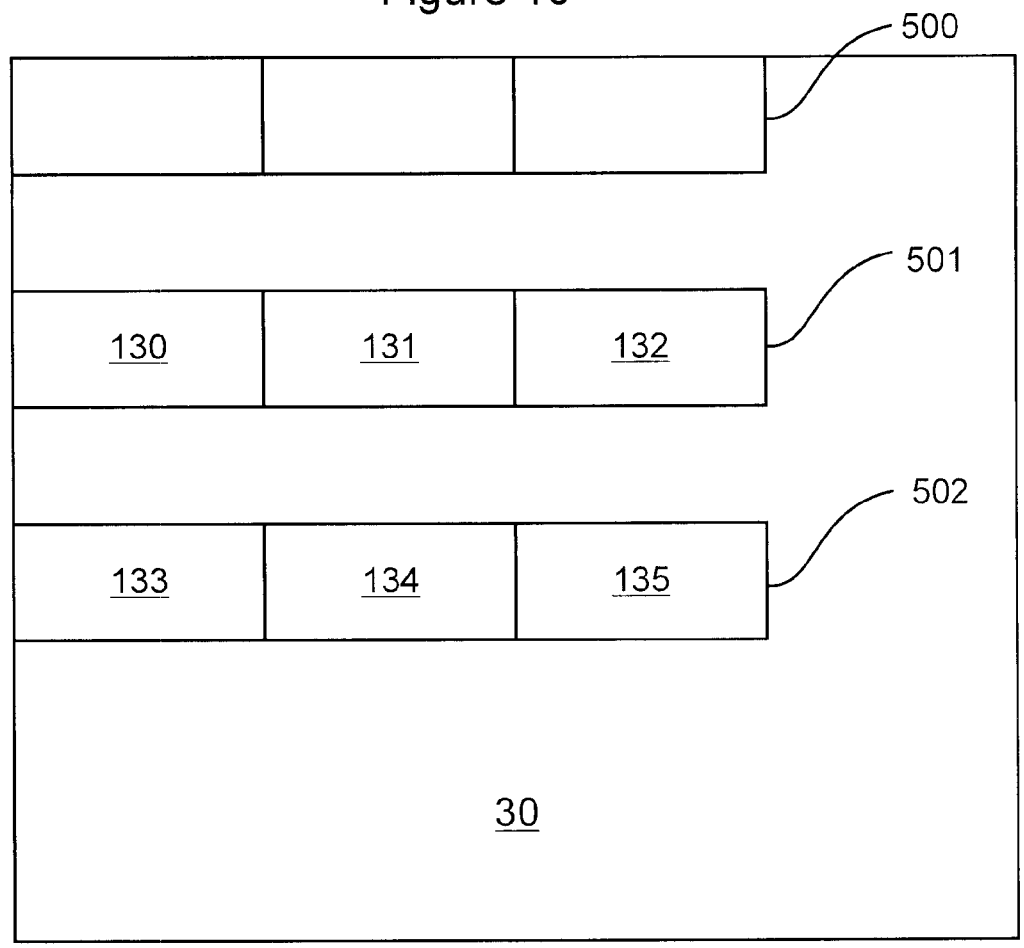

Referring to FIG. 11, in the case of multiple copy operations, when the source memory start locations are spaced by a constant value within a same memory region, the image memory region 30 for example, the amount of data elements grouped into data blocks to be copied for every copy operation is the same. Preferably, the stride is set to that value which separates the various source memory start locations, for instance a difference in address separating data block 500 and data block 501. In this multiple copy operation, referencing data block 500, pre-fetches all data elements, 130, 131, 132, that located within a second data block 501. Reference to the next memory location of data block 501 causes a pre-fetching of data elements 133, 134, 135, located within a third data block 502. The start address for each memory location is incremented by the stride for the given region. This multiple copy operation is also useful for copying a two dimensional sub-structure of a larger two-dimensional structure.

For instance, a process that pre-fetches multiple data blocks would be applicable to compressed images stored in memory, such as JPEG compressed images. In this case processing of data blocks of the image is required due to the nature of the compression. In this manner when a number of data blocks are read from the image data stored in the image region of memory by the processor, the processor has sufficient data pre-fetched from the image memory region to perform at least partial decompression of the image. Otherwise, if not enough data blocks have been read from the image region of memory then the processor may experience a stall cycle where it has to references the image portion of memory again in order to obtain a next data block in order to continue the partial decompression of a previous data block. A situation results in a processor stall because the data block size is insufficient for autonomous processing thereof. On the other hand if too many data blocks are read then the processor will either not utilize the rest of the data or will have too much bus utilization at one time delaying other bus utilizing devices unnecessarily. Therefore, for compressed image files a specific region in memory is optionally designated.

This region based-pre fetching approach is ideal for multi-tasking environments. In this case when operating using a multi-tasking environment the operating system keeps track of the current application being executed. When an application is selected for execution, the operating system loads the corresponding register lookup table for the current application. Such that upon a subsequent application being selected for execution, the register lookup table from the first application is stored and the register lookup table from the subsequent application is loaded into the processor. In this manner when memory reference instructions are executing in the program stream, the operating system compares the memory region being accessed by instruction within the current program stream and uses the most current strides provided by the application in order to perform efficient data processing for a given application.

This type of stride and associated processing system is also applicable to servers having a number of "dumb" terminals coupled to a main processor within the server. Where the dumb terminals have limited processing capacity and where the main processor within the server is used for processing data from each of these dumb terminals. Such that when an application being executed on a dumb terminal is loaded for execution by the processor, the application specific register lookup table is loaded into the processor for efficient processing of the program stream in such a manner that processor stalls are reduced. In this manner, when processing, for instance multimedia applications, having a specific stride is advantageous since it provides for more efficient processing of each application.

In an alternative embodiment the stride stored within the region_stride register is re-evaluated based on processor performance with respect to accessing of a predetermined memory region. For instance if the base region is accessed using an initial region_stride, but it was determined by additional instructions within the program stream or within the processor hardware, that pre-fetching using this stride results in a processor stall, the software then varies the stride such that there is more of a look ahead in the data being fetched for the predetermined memory region. If upon varying of the region stride the improvement in processing time was marginally faster, the software then varies the region stride again, until the stride is about a maximum acceptable stride or until a predetermined performance improvement is achieved. This improved stride is then incorporated into the compiled code in the form of self-modifying code such that upon a subsequent execution of the software application containing the given program stream an improved stride based on the modification is stored within the region_stride register. Preferably, periodic evaluation of the stride is performed to allow for minor tuning of system performance.

Execution of a software application having memory reference instructions within an instruction stream results in a related frequency of pre-fetch operations from a memory region. In this manner through efficient coding of the software application and strict compilation, the hardware and software directed approach to pre-fetching spreads the occurrence of pre-fetch data block transfers in time, thereby preventing bursty bus utilization when possible and decreasing the probability of processor stall cycles. In accordance with the example embodiment, software is used to provide stride information about memory address regions rather than using hardware to determine stride information, where the placement of instruction within the program stream, which reference memory locations within data memory, controls the frequency of pre-fetching. Of course, the spreading of pre-fetches in time is correlated to a memory reference pattern resulting from a frequency of memory reference instructions contained in the program stream. The closer the memory reference instructions are spaced, the greater is the chance of the processor stalling.

Advantageously, the pre-fetching process may additionally be enhanced by having the compiler insert an indication, preferably in the form of a bit, in the memory reference instructions that indicates whether a pre-fetch is to be initiated for a memory reference instruction referencing a given region. This additional hardware 62a would be provided within the processor to utilize the indication included within the memory access instructions for use in selectively disabling pre-fetch operation by the pre-fetching circuit 62. In some cases a pre-fetching of data may not be advantageous. Without having an indication to process otherwise the processor would pre-fetch the data unless instructed otherwise. At compile time if it is know that pre-fetching of a data block may result in a processor stall, then through the use of the indication the stall condition is avoided. Additionally separate hardware for data block pre-fetching may be added, or existing data block fetching hardware resources may be used to perform the pre-fetch.

Advantageously this hardware and software directed approach to pre-fetching has a minimal effect on the instruction processing bandwidth of the processor since prior to accessing a memory region only the region base address, region size and size of the stride are provided to the processor. Further, these registers occupy only a small amount of additional hardware resources within the on a chip.

Additionally by providing a spreading of pre-fetches in time, by using the additional registers, and by specifying within the memory reference instructions as to whether a pre-fetching operation is to take place, processor cache misses are decreased, since the software is used to transfer a memory reference pattern—spacing of memory reference instructions—to the pre-fetch hardware. Advantageously by using a combination of both hardware and software directed pre-fetching, it allows for a simpler design and implementation than that which is taught in the prior art, while providing for a means to reduce processor cache misses, as opposed to dealing with the cache misses when they occur.

Alternatively, an operating system supporting a structured memory allocation architecture automatically allocates memory within regions of appropriate stride or alternatively, automatically defines regions of appropriate stride about allocated memory. Thus, when image data memory is requested, the operating system allocates it within a region supporting image data. Thus, each handle points to a pointer table for an application but that application's data is stored non-contiguously by the operating system in accordance with stride requirements. As such, the operating system then provides stride data to the processor absent application software involvement or knowledge. Thus, the application software need not be modified to support different processor hardware or new and better pre-fetch stride values.

Thus the present invention is highly advantageous since it is implementable within any of several system levels with efficient implementation being possible transparent to application developers when desired.

Numerous other embodiments may be envisaged without departing from the spirit or scope of the invention.

What is claimed is:

1. A processor for processing of instruction data including memory access instructions for accessing an external RAM memory comprising:

a region stride memory location for storing of a pre-fetch operation stride;

a memory region identifier for storing data indicative of a memory region within the external RAM memory within which to apply the stored pre-fetch operation stride;

a pre-fetch circuit for pre-fetching of data from the external RAM memory, the pre-fetching circuit responsive to the pre-fetch memory stride when accessing data within the pre-fetch memory region for fetching from said memory using said stride.

2. A processor according to claim 1, wherein the memory region identifier comprises at least a pre-fetch memory start address region base register within the processor.

3. A processor according to claim 2, wherein the memory region identifier comprises at least a pre-fetch memory size region size register within the processor.

4. A processor according to claim 3, wherein the region stride memory location comprises at least a pre-fetch stride region stride register within the processor.

5. A processor according to claim 4, wherein the at least a region stride register is variable by execution of instruction data for storing of a pre-fetch operation stride.

6. A processor according to claim 5, wherein the processor is absent pre-fetch dynamic stride calculation circuitry.

7. A processor according to claim 4, comprising a register lookup table for storing a set of registers in the form of the pre-fetch memory start address register, the pre-fetch memory size register and the pre-fetch stride memory register.

8. A processor according to claim 7, wherein the lookup table is indexed by the pre-fetch memory start address register from within the plurality of pre-fetch memory start address registers stored therein.

9. A processor according to claim 1, wherein the processor is absent pre-fetch stride calculation circuitry.

10. A processor according to claim 1, comprising a circuit for disabling pre-fetching, the circuit responsive to an indicator included within the memory access instructions for use in selectively disabling pre-fetch operation by the pre-fetching circuit.

11. A method of pre-fetching data from external RAM memory, comprising the steps of:

providing to a processor for use in storing within memory locations a stride and data determinative of a memory region within the external RAM, the stride for use in pre-fetching of data from within the memory region;

determining a region within which the data is stored for being pre-fetched therefrom;

determining the pre-fetch stride stored within the processor in association with the region;

defining a data block having a size based on the pre-fetch stride and a start location based on a previously pre-fetched data block memory location within the external memory; and, copying the data block located at the start location to a destination memory location.

12. A method of pre-fetching data according to claim 11, wherein the pre-fetch stride is provided to the processor by software in execution, the pre-fetch stride being associated with a region identified by the software.

13. A method of pre-fetching data according to claim 11, wherein the region is for storing of similar data, the similar data for being accessed using a same stride.

14. A method of pre-fetching data according to claim 11, wherein data from several different software applications are stored within a same region.

15. A method of pre-fetching data according to claim 11, wherein the region is selected from a plurality of regions, each region having an associated stride, the associated stride previously stored within the processor in association with the region.

16. A method of pre-fetching a data block from data memory into buffer memory, comprising the steps of:

providing a processor having memory therein and a pre-fetch circuit;

providing random access memory;

providing within the memory within the processor a lookup table having stored therein a relation between at least a region and a corresponding region stride;

comparing a data memory reference instruction data memory access address to the at least a region stored within the lookup table to determine a region within which the data memory reference instruction data memory access address is located; and, providing the region stride associated with the region within which the data memory reference instruction data memory access address is located to the pre-fetch circuit of the processor.

17. A method of pre-fetching according to claim 16, comprising the step of:

copying a data block having data located at least at an address determined by data memory reference instruction data memory access address plus the stride into a buffer memory.

18. A method of pre-fetching according to claim 16, wherein the lookup table is linked to a set of registers and wherein a value from the lookup table is the value within the registers, the value corresponding to the region within which the data memory reference instruction data memory access address is located.

19. A process for performing the step of:

performing a memory allocation operation, the memory allocation operation dependent on a data type for storage within the allocated memory, the memory allocation operation including the steps of:

allocating a memory region within memory, storing within memory within the processor data indicative of a first pre-fetch stride for the allocated memory region, and storing within memory within the processor data indicative of the allocated memory region location and size within which to employ the first pre-fetch stride.

20. A process according to claim 19, wherein the process forms part of an operating system for execution on a processor supporting hardware pre-fetching of data.

* * * * *